US011434952B2

(12) United States Patent
Spino

(10) Patent No.: US 11,434,952 B2
(45) Date of Patent: Sep. 6, 2022

(54) OBJECT ANCHORING ASSEMBLY

(71) Applicant: Matthew Spino, Irwin, PA (US)

(72) Inventor: Matthew Spino, Irwin, PA (US)

(*) Notice: Subject to any disclaimer, the term of this patent is extended or adjusted under 35 U.S.C. 154(b) by 48 days.

(21) Appl. No.: 17/124,157

(22) Filed: Dec. 16, 2020

(65) Prior Publication Data
US 2022/0186769 A1   Jun. 16, 2022

(51) Int. Cl.
```
F16B 47/00      (2006.01)
A47G 29/093     (2006.01)
A47J 47/16      (2006.01)
F16B 2/12       (2006.01)
E05B 73/00      (2006.01)
```

(52) U.S. Cl.
CPC .......... *F16B 47/006* (2013.01); *A47G 29/093* (2013.01); *A47J 47/16* (2013.01); *F16B 2/12* (2013.01); *E05B 73/0082* (2013.01)

(58) Field of Classification Search
CPC ........ F16B 2/12; F16B 47/006; H04B 1/3877; E05B 73/0082; A47G 29/093; A47G 23/0225; A47J 47/16
See application file for complete search history.

(56) References Cited

U.S. PATENT DOCUMENTS

| | | | | |
|---|---|---|---|---|
| 5,398,898 A * | 3/1995 | Bever | ...................... | A47J 43/18 248/154 |
| D425,345 S * | 5/2000 | Ohm | .............................. | D6/518 |
| 6,892,994 B1 * | 5/2005 | Renshaw | ................ | F16M 13/02 248/316.5 |
| 7,813,118 B2 * | 10/2010 | Burge | .................... | H04R 1/026 361/825 |
| 8,066,241 B2 * | 11/2011 | Yu | .......................... | F16M 13/00 248/924 |
| 8,235,334 B1 * | 8/2012 | Kobal | .................... | F16M 11/38 248/346.07 |
| 8,998,048 B1 * | 4/2015 | Wu | ........................ | F16M 13/02 224/443 |
| 9,038,971 B1 * | 5/2015 | Guthrie | .................. | F16M 11/40 361/679.56 |
| 9,128,668 B2 * | 9/2015 | Johnson | ............... | F16M 11/041 |
| 9,161,466 B2 * | 10/2015 | Huang | ................. | F16M 11/041 |
| 10,001,153 B1 * | 6/2018 | Fan | ......................... | F16M 13/00 |
| 10,035,686 B2 * | 7/2018 | Kreischer | ............ | B62D 65/022 |
| 10,060,572 B1 * | 8/2018 | Don | ........................ | F16M 11/16 |
| 10,315,889 B2 * | 6/2019 | Kreischer | ................ | B66C 1/42 |

(Continued)

FOREIGN PATENT DOCUMENTS

| | | | |
|---|---|---|---|
| CN | 110630877 A | * 12/2019 | ................ F16B 2/10 |
| WO | WO2005106262 | 11/2005 | |

*Primary Examiner* — Eret C McNichols

(57) ABSTRACT

An object anchoring assembly includes a housing that can be positioned on a horizontal support surface having an object being positioned on top of the housing. A plurality of arms is each slidably integrated into the housing and each of the arms is positionable in a retracted position or an extended position. A plurality of engagements is each is movably integrated into a respective one of the arms. Additionally, each of the engagements engages the housing at a variety of locations to retain the arms at a selected degree of extension to accommodate dimensions of the object placed on the housing. A coupler is movably coupled to the housing to engage the support surface thereby inhibiting the housing from sliding on the support surface.

12 Claims, 8 Drawing Sheets

(56) References Cited

U.S. PATENT DOCUMENTS

| | | | |
|---|---|---|---|
| 2006/0284043 A1* | 12/2006 | Paradise | A47J 47/16 248/205.5 |
| 2010/0108828 A1* | 5/2010 | Yu | F16M 11/041 248/123.11 |
| 2011/0220767 A1* | 9/2011 | Stewart | A47G 19/00 248/205.8 |
| 2012/0312936 A1* | 12/2012 | Huang | F16M 11/041 248/316.1 |
| 2013/0148273 A1* | 6/2013 | Tsai | F16M 11/041 361/679.01 |
| 2014/0263931 A1* | 9/2014 | Chen | F16M 13/00 248/576 |
| 2015/0060624 A1* | 3/2015 | Huang | H05K 5/0208 248/316.4 |
| 2017/0009935 A1* | 1/2017 | Theis | F16M 13/022 |
| 2017/0188724 A1* | 7/2017 | Lin | F16M 13/00 |
| 2020/0378415 A1* | 12/2020 | Dammermann | F16M 11/041 |
| 2021/0087038 A1* | 3/2021 | Figa | F16B 2/12 |

* cited by examiner

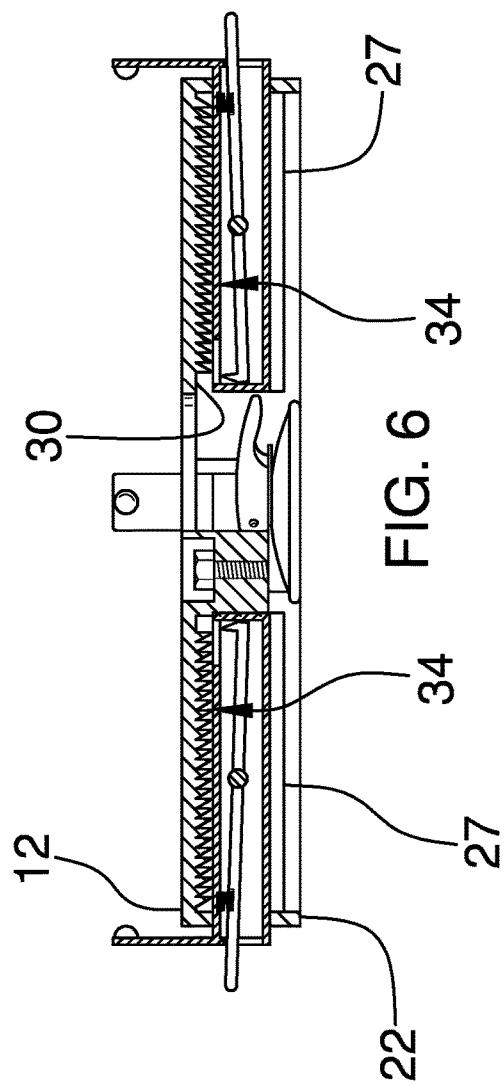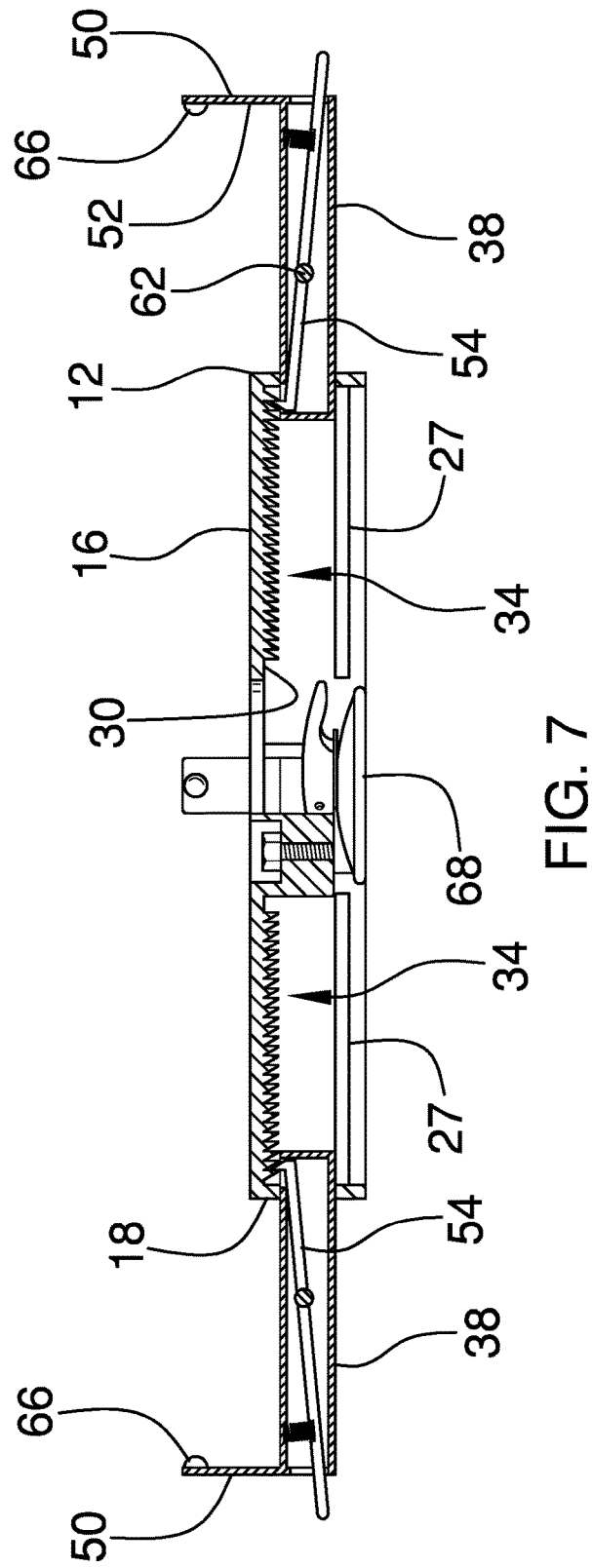

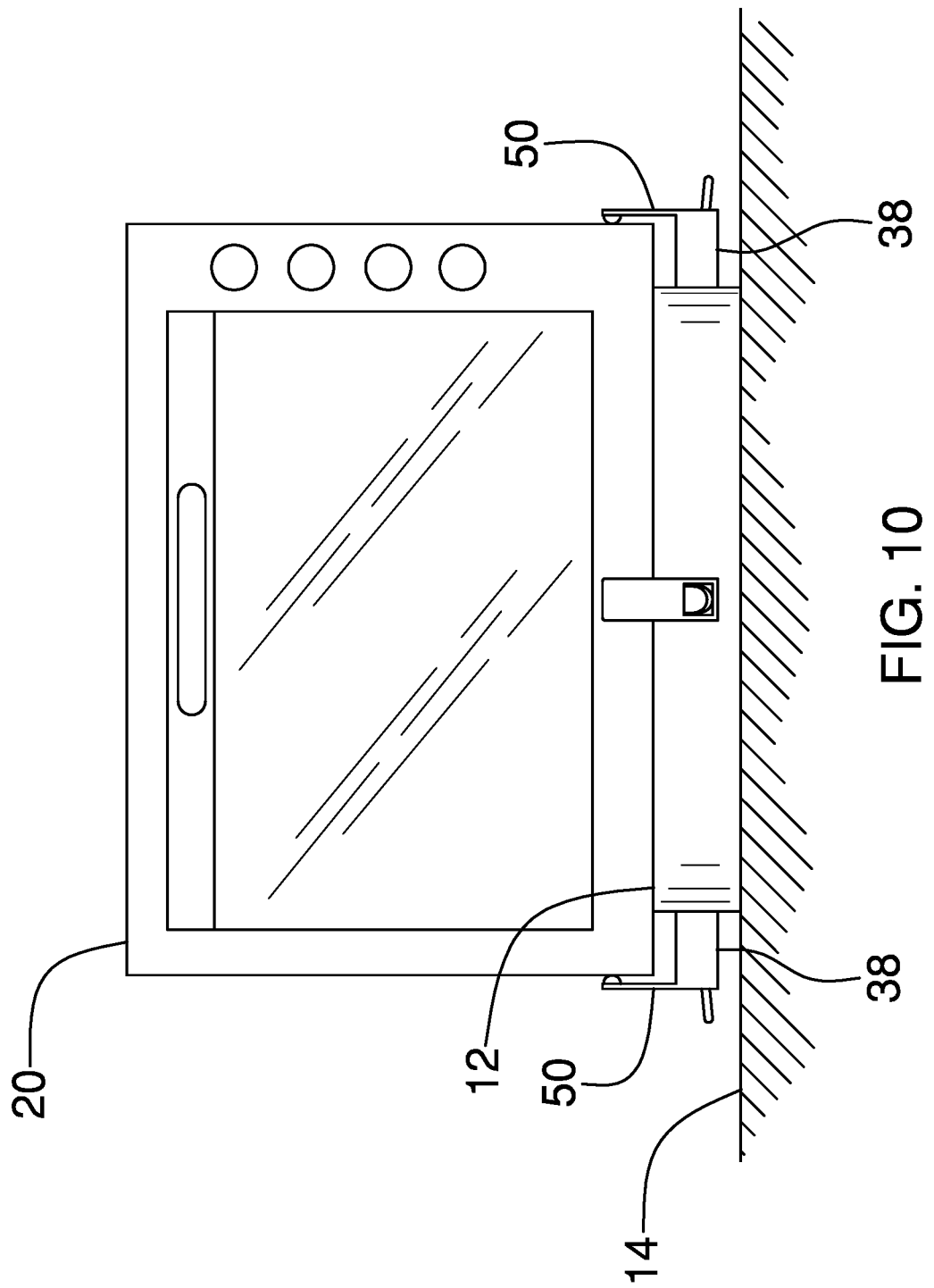

OBJECT ANCHORING ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to anchoring devices and more particularly pertains to a new anchoring device for securing a variety of objects to a support surface. The anchoring device includes arms that can be positioned at different lengths for engaging the object.

(2) Description of Related Art Including Information Disclosed Under 37 CFR 1.97 and 1.98

The prior art relates to anchoring devices including a variety of suction cup couplers for attaching an object to a planar support surface. The prior art discloses a smart phone holder that includes a plurality of arms that can engage a smart phone. The prior art also discloses a mounting apparatus that includes a plurality of suction cups for engaging a support surface.

(h) BRIEF SUMMARY OF THE INVENTION

An embodiment of the disclosure meets the needs presented above by generally comprising a housing that can be positioned on a horizontal support surface having an object being positioned on top of the housing. A plurality of arms is each slidably integrated into the housing and each of the arms is positionable in a retracted position or an extended position. A plurality of engagements is each is movably integrated into a respective one of the arms. Additionally, each of the engagements engages the housing at a variety of locations to retain the arms at a selected degree of extension to accommodate dimensions of the object placed on the housing. A coupler is movably coupled to the housing to engage the support surface thereby inhibiting the housing from sliding on the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a cross sectional view taken along line 6-6 of FIG. 2 of an embodiment of the disclosure showing a plurality of engagements being disengaged from a groove.

FIG. 7 is a cross sectional view taken along line 7-7 of an embodiment of the disclosure showing a plurality of arms being extended from a housing.

FIG. 10 is a perspective in-use view of an embodiment of the disclosure.

(j) DETAILED DESCRIPTION OF THE INVENTION

Figure 1:
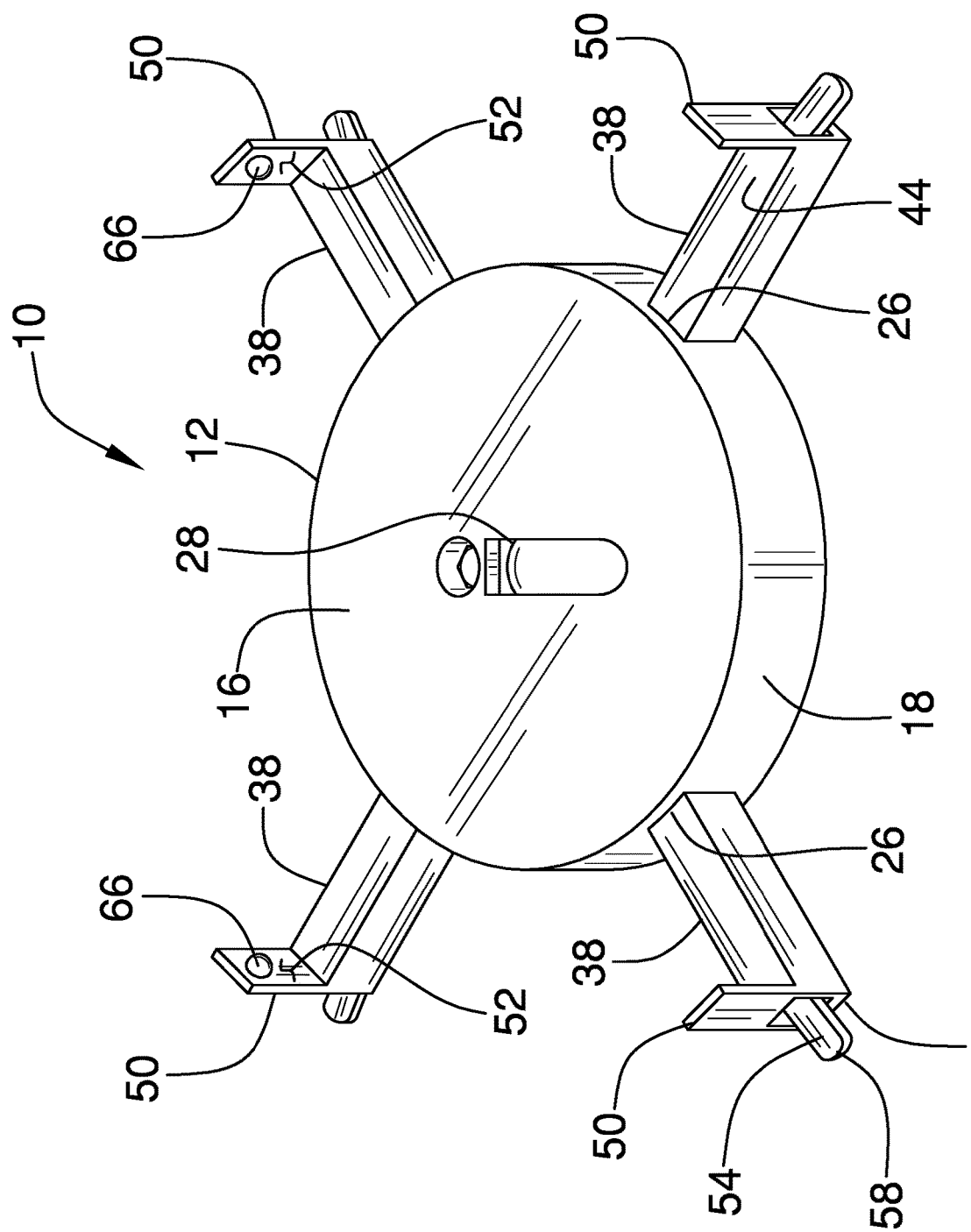
FIG. 1 is a top perspective view of an object anchoring assembly according to an embodiment of the disclosure.
Figure 2:
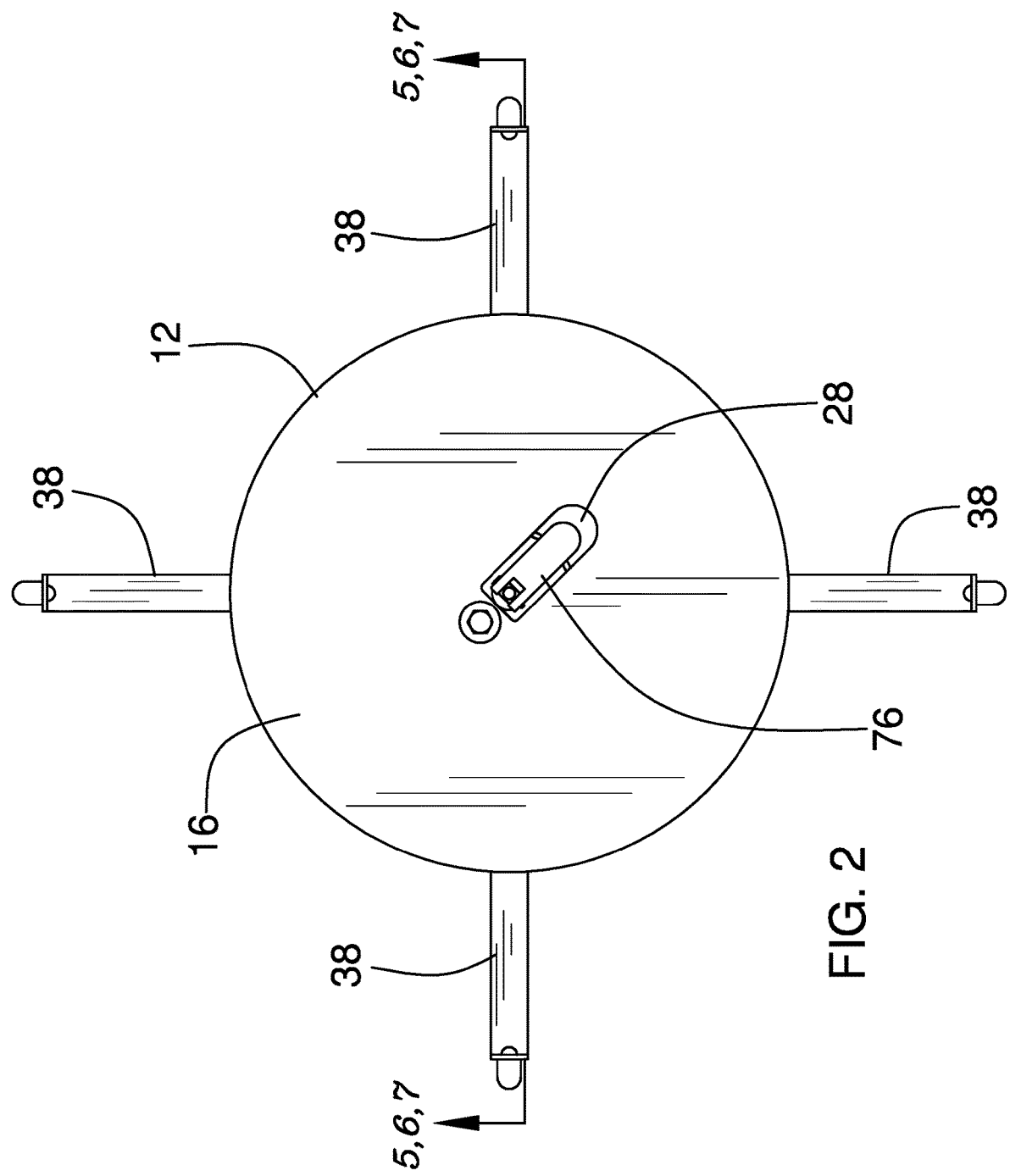
FIG. 2 is a top view of an embodiment of the disclosure.
Figure 3:
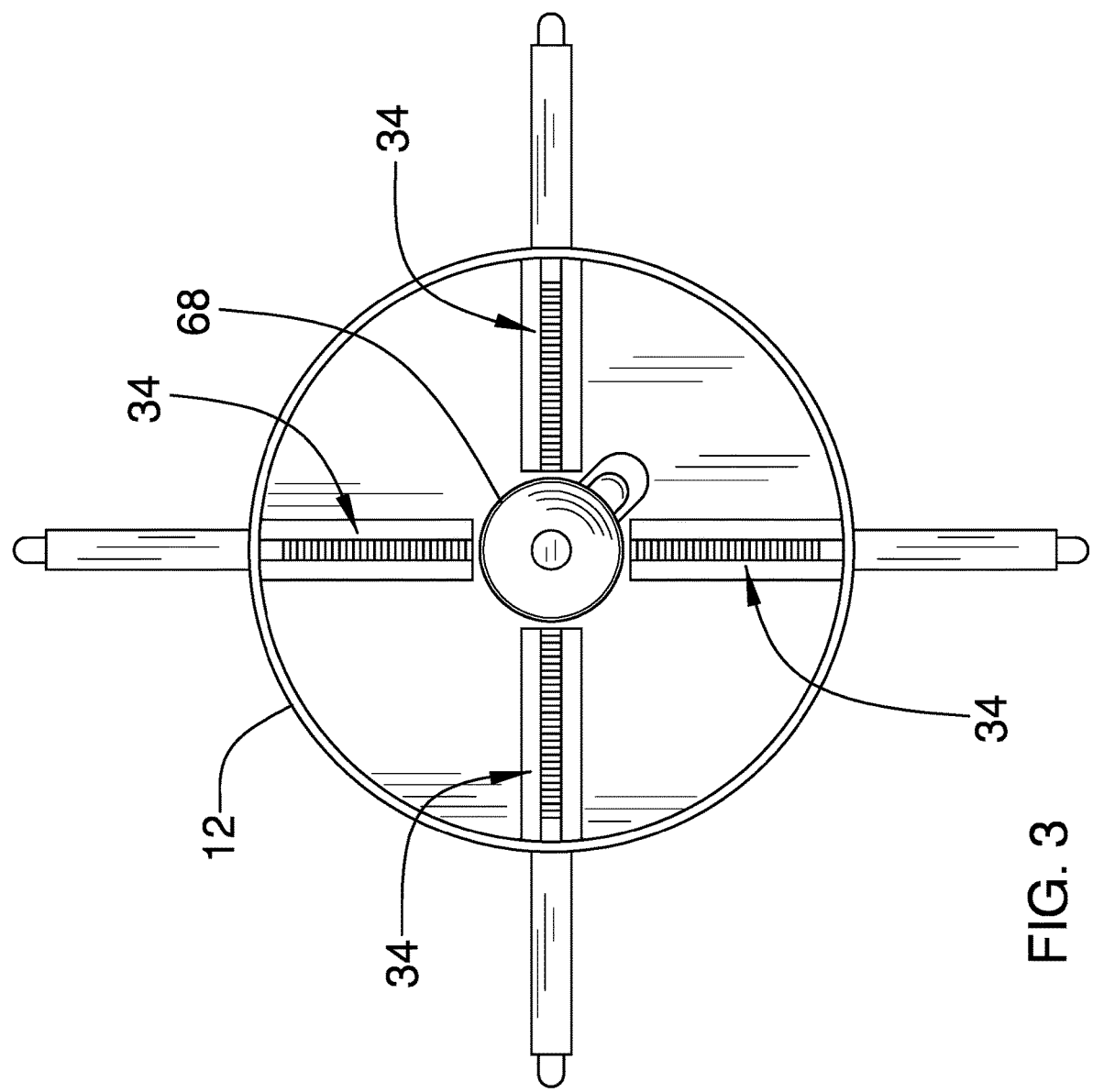
FIG. 3 is a bottom view of an embodiment of the disclosure.
Figure 4:
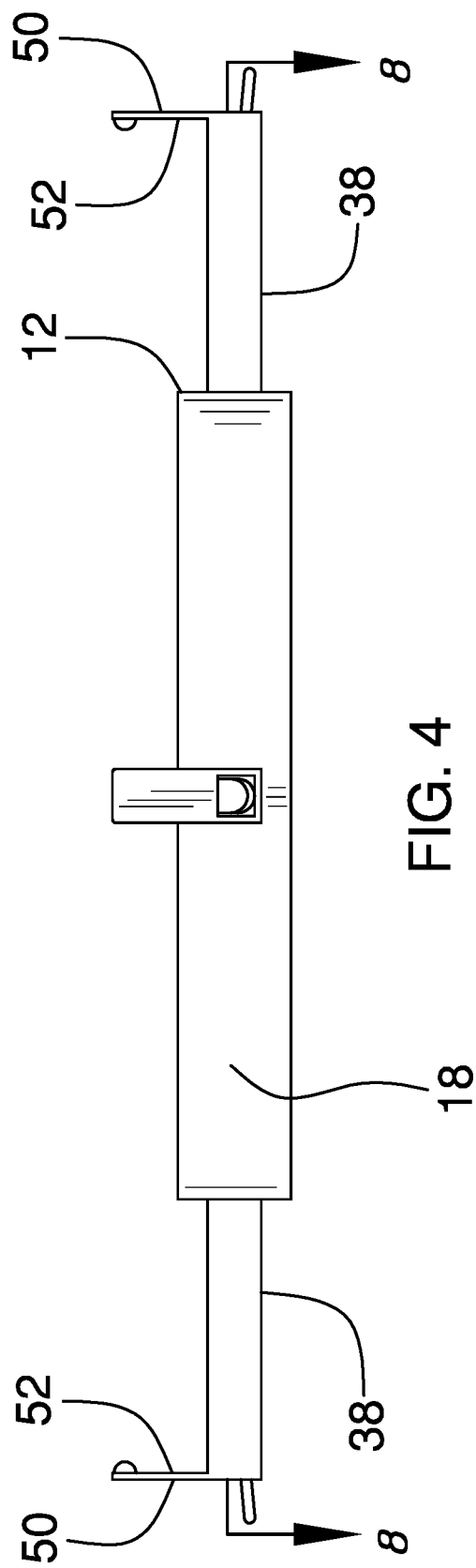
FIG. 4 is a front view of an embodiment of the disclosure.
Figure 5:
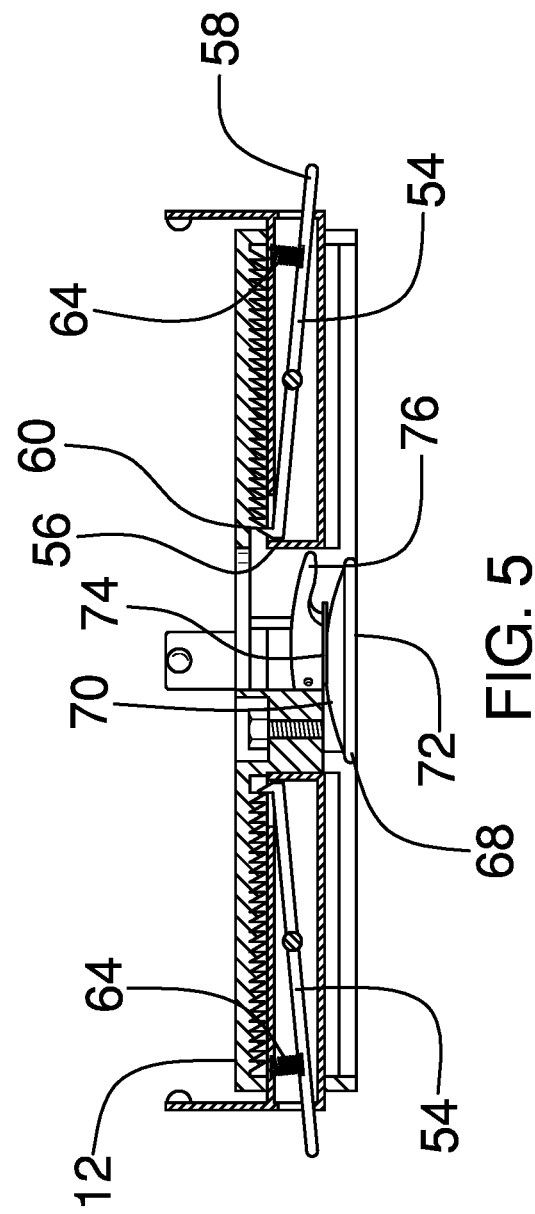
FIG. 5 is a cross sectional view taken along line 5-5 of FIG. 2 of an embodiment of the disclosure showing a plurality of engagements engaging a groove.
Figure 8:
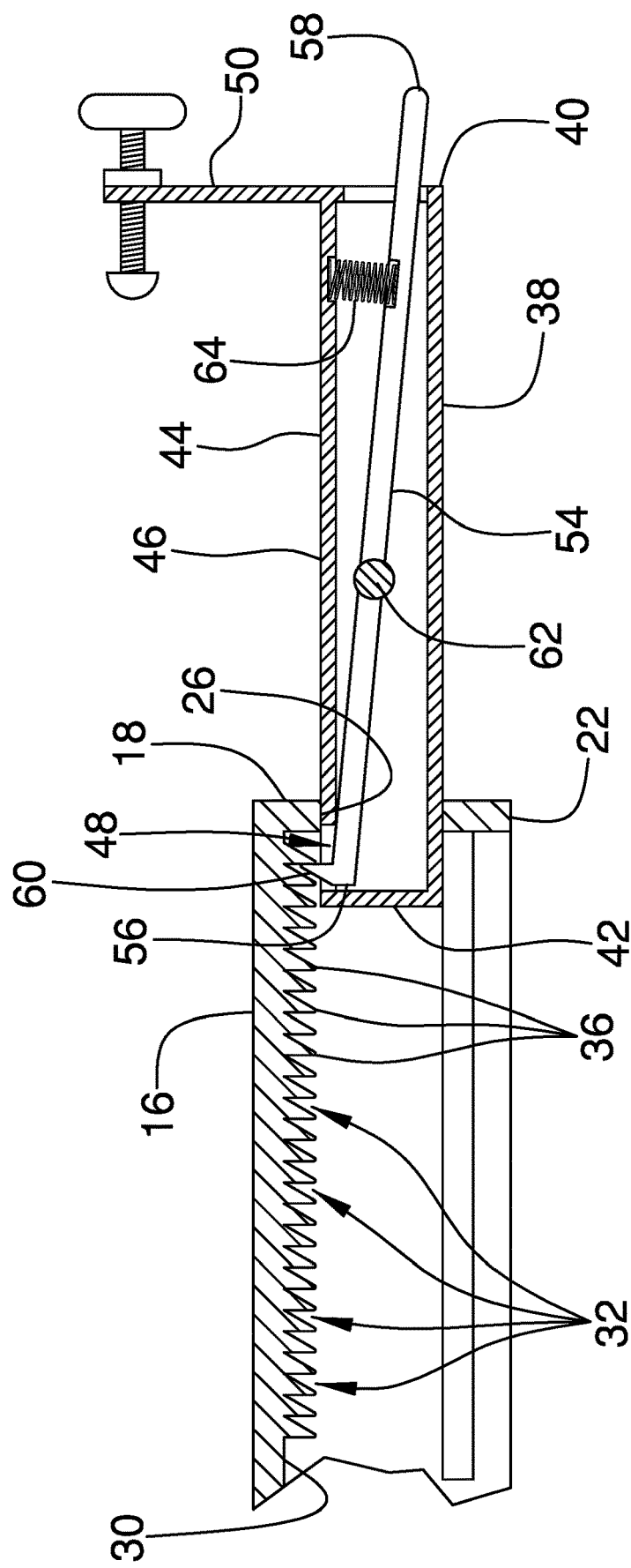
FIG. 8 is a cross sectional view taken along line 8-8 of FIG. 4 of an embodiment of the disclosure.
Figure 9:
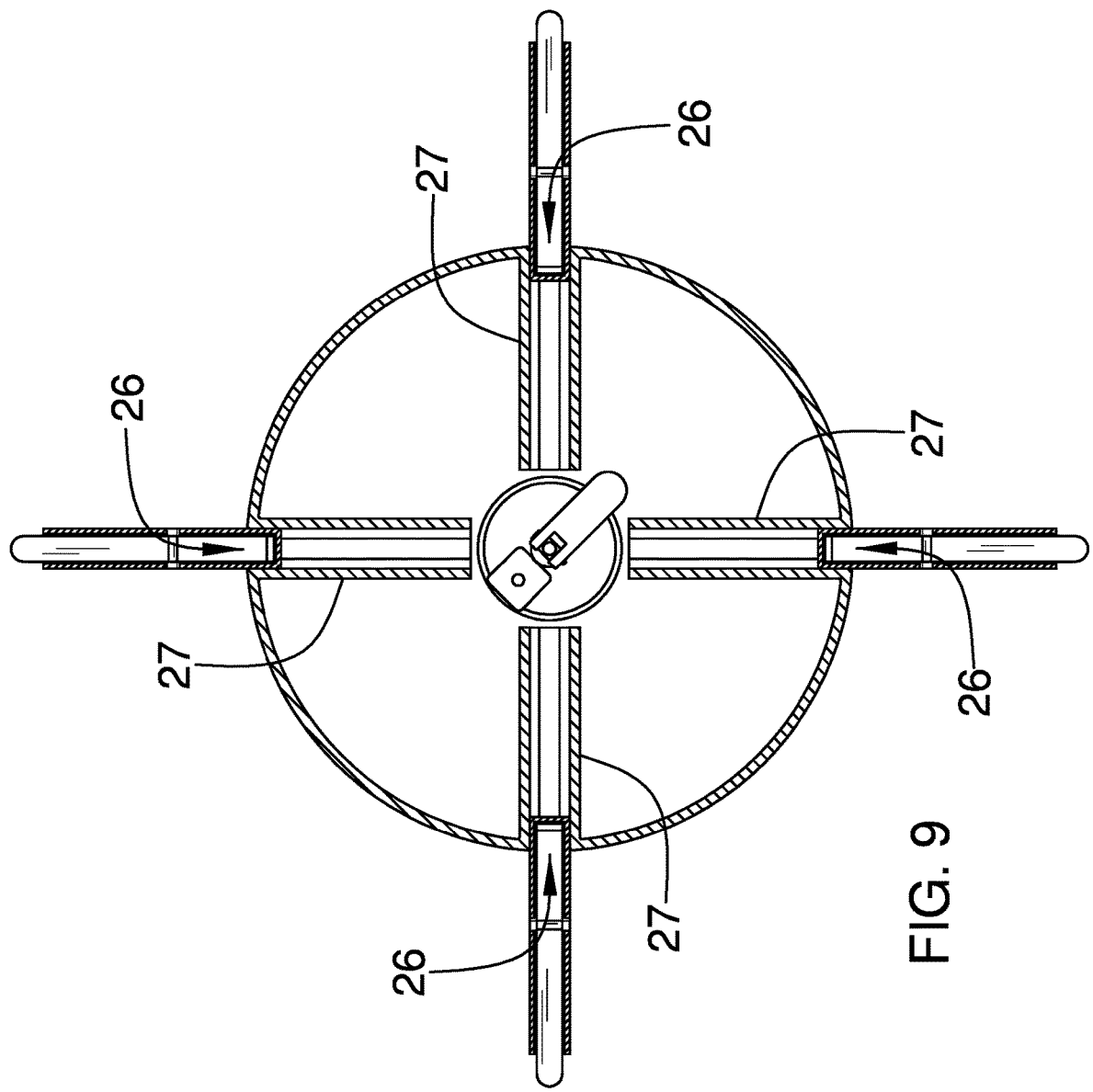
FIG. 9 is a top cut-away view of an embodiment of the disclosure.

With reference now to the drawings, and in particular to FIGS. 1 through 10 thereof, a new anchoring device embodying the principles and concepts of an embodiment of the disclosure and generally designated by the reference numeral 10 will be described.

As best illustrated in FIGS. 1 through 10, the object anchoring assembly 10 generally comprises a housing 12 that can be positioned on a horizontal support surface 14, such as a table top, a floor or other horizontal support surface 14. The housing 12 has a top wall 16 and a perimeter wall 18 extending therebetween and an object 20 can be positioned on the top wall 16. The perimeter wall 18 has a distal edge 22 with respect to the top wall 16 to define an opening 24 into the housing 12. Additionally, the perimeter wall 18 has a plurality of holes 26 each extending into an interior of the housing 12, and the holes 26 are spaced apart from each other and are evenly distributed around the perimeter wall 18. The housing 12 has a plurality of channels 27 being integrated therein and each of the channels 27 is aligned with a respective one of the holes 26 in the perimeter wall 18. The perimeter wall 18 may be continuously arcuate about a center point of the top wall 16 such that the housing 12 has a disk shape. Additionally, the perimeter wall 18 may have a plurality of intersecting sides such that the housing 12 has a polygonal shape.

The top wall 16 has an access hole 28 extending therethrough and the access hole 28 is elongated. Additionally, the access hole 28 extends from a center point of the top wall 16 toward the perimeter wall 18. The top wall 16 has a lower surface 30 and the lower surface 30 has a plurality of grooves 32 each extending upwardly therein. The plurality of grooves 32 is arranged into a plurality of sets of grooves 34. Moreover, each of sets of grooves 34 is spaced apart from each other and is distributed between the center point of the top wall 16 and a respective one of the holes 26 in the perimeter wall 18. Additionally, the plurality of grooves 32 defines a plurality of teeth 36.

A plurality of arms 38 is provided and each of the arms 38 is slidably integrated into the housing 12. Each of the arms 38 is positionable in a retracted position having each of the arms 38 being retracted into the housing 12. Conversely, each of the arms 38 is positionable in an extended position having the arms 38 extending outwardly from the housing 12. Each of the arms 38 has a first end 40, a second end 42 and an outer wall 44 extending therebetween, and the first end 40 is open. Each of the arms 38 is slidably positioned in a respective one of the holes 26 in the perimeter wall 18 of the housing 12. Additionally, each of the arms 38 is positioned in a respective one of the channels 27 in the housing 12.

The outer wall 44 has top side 46, the top side 46 has a grip hole 48 extending therethrough, and the grip hole 48 is positioned adjacent to the second end 42. The top wall 16 has a stop 50 extending upwardly therefrom and the stop 50 is aligned with the first end 40. The stop 50 has a first surface 52 that is directed toward the housing 12 and each of the arms 38 is oriented to extend along a receptive one of the sets of grooves 34 in the lower surface 30 of the top wall 16 of the housing 12.

A plurality of engagements 54 is provided and each of the engagements 54 is movably integrated into a respective one of the arms 38. Each of the engagements 54 engages the housing 12 at a variety of locations when the arms 38 are urged between the retracted position and the extended position for retaining the arms 38 at a selected degree of extension. In this way the arms 38 can accommodate dimensions of the object 20 placed on the housing 12. Each of the engagements 54 has a primary end 56 and a secondary end 58, and each of the engagements 54 has a finger 60 extending upwardly therefrom. The finger 60 is positioned adjacent to the primary end 56 of a respective engagement. Each of the engagements 54 is pivotally coupled to the respective arm 38 at a pivot point 62 that is centrally located in the respective arm 38. Each of the engagements 54 extends outwardly through the first end 40 of the respective arm 38 such that the secondary end 58 of each of the engagements 54 is exposed. In this way the secondary end 58 of each of the engagements 54 can be manipulated by a user.

A plurality of biasing members 64 is provided and each of the biasing members 64 is positioned within a respective one of the arms 38. Each of the biasing members 64 engages the engagement that is positioned in the respective arm 38. Moreover, each of the biasing members 64 is positioned between the pivot point 62 on the respective engagement 54 and the secondary end 58 of the respective engagement 54 such that the primary end 56 of the respective engagement 54 is biased upwardly through the grip hole 48 in the respective arm 38. In this way the finger 60 on the respective engagement 54 can engage a respective one of grooves 32 in the lower surface 30 of the top wall 16 of the housing 12 for retaining the respective arm 38 at a selected location. Conversely, the finger 60 on a respective engagement 54 disengages the respective groove 32 when the secondary end 58 of the respective engagement 54 is lifted upwardly to facilitate the respective arm 38 to be retracted or extended.

A plurality of bumpers 66 is provided and each of the bumpers 66 is coupled to the first surface 52 of the stop 50 on a respective one of the arm 38. In this way each of the bumpers 66 can compress against the object 20 when the arms 38 are extended or retracted in the housing 12 for restraining the object 20 on the housing 12. Additionally, each of the bumpers 66 is comprised of a resiliently compressible material.

A coupler 68 is movably coupled to the housing 12 and the coupler 68 can engage the support surface 14 to inhibit the housing 12 from sliding on the support surface 14. The coupler 68 has a top side 70 and an outer edge 72, and the top side 70 is concavely arcuate between an apex 74 of the top side 70 and the outer edge 72. In this way the coupler 68 forms a suction cup that can suctionally engage the support surface 14. Additionally, the coupler 68 is comprised of a resiliently deformable material such as silicone or the like.

A lever 76 is movably coupled to the coupler 68 and the lever 76 is positioned in the access hole 28 in the top wall 16 of the housing 12. In this way the lever 76 is accessible to a user. The lever 76 engages the apex 74 on the top side 46 of the coupler 68 and the lever 76 urges the apex 74 upwardly from the distal edge 22 of the coupler 68 when distal edge 22 engages the support surface 14 and when the lever 76 is moved into a locking position. In this way the lever 76 urges the coupler 68 to suctionally engage the support surface 14. Conversely, the lever 76 urges the apex 74 downwardly toward the distal edge 22 when the lever 76 is moved into an unlocking position thereby urging the coupler 68 to disengage the support surface 14.

In use, the housing 12 is placed on the support surface 14 at a desired location and the lever 76 is urged into the locking position to secure the housing 12 on the support surface 14. The object 20 is placed on the housing 12 and each of the arms 38 is extended or retracted to facilitate the stop 50 on each of the arms 38 to abut the object 20. In this way the object 20 is secured to the housing 12 thereby inhibiting the object 20 from tipping over or being dislodged on the housing 12. The secondary end 58 of the engagement 54 in each of the arms 38 is urged upwardly to facilitate the arms 38 to be extended outwardly from the housing 12 for removing the object 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An object anchoring assembly for anchoring a variety of objects to a support surface, said assembly comprising:
 a housing being configured to be positioned on a horizontal support surface having an object being positioned on top of said housing;
 a plurality of arms, each of said arms being slidably integrated into said housing, each of said arms being positionable in a retracted position having each of said arms being retracted into said housing, each of said arms being positionable in an extended position having said arms extended outwardly from said housing;
 a plurality of engagements, each of said engagements being movably integrated into a respective one of said arms, each of said engagements engaging said housing at a variety of locations when the arms are urged between said retracted position and said extended position for retaining said arms at a selected degree of extension wherein said arms are configured to accommodate dimensions of the object placed on said housing;
 a coupler being movably coupled to said housing wherein said coupler is configured to engage the support surface to inhibit said housing from sliding on the support surface; and
 wherein said coupler has a top side and an outer edge, said top side being concavely arcuate between an apex of said top side and said distal edge such that said coupler forms a suction cup wherein said coupler is configured to suctionally engage the support surface.

2. The assembly according to claim 1, wherein said housing has a top wall and a perimeter wall extending therebetween wherein said top wall is configured to have an object positioned thereon, said perimeter wall having a distal edge with respect to said top wall to define an opening into said housing, said perimeter wall having a plurality of holes each extending into an interior of said housing, said holes being spaced apart from each other and being evenly distributed around said perimeter wall.

3. The assembly according to claim 2, wherein said top wall has a lower surface, said lower surface having a plurality of grooves each extending upwardly therein, said plurality of grooves being arranged into a plurality of set of grooves, each of sets of grooves being spaced apart from each other and being distributed between a center point of said top wall and a respective one of said holes in said perimeter wall, each of said grooves defining a plurality of teeth.

4. The assembly according to claim 1, further comprising a lever being movably coupled to said coupler, said lever being positioned in an access hole in a top wall of said housing wherein said lever is configured to be accessible to a user, said lever engaging said apex on said top side of said coupler, said lever urging said apex upwardly from said distal edge of said coupler when distal edge engages the support surface and when said lever is moved into a locking position wherein said lever is configured to urge said coupler to suctionally engage the support surface, said lever urging said apex downwardly toward said distal edge when said lever is moved into an unlocking position wherein said lever is configured to urge said coupler to disengage the support surface.

5. An object anchoring assembly for anchoring a variety of objects to a support surface, said assembly comprising:
 a housing being configured to be positioned on a horizontal support surface having an object being positioned on top of said housing;
 a plurality of arms, each of said arms being slidably integrated into said housing, each of said arms being positionable in a retracted position having each of said arms being retracted into said housing, each of said arms being positionable in an extended position having said arms extended outwardly from said housing;
 a plurality of engagements, each of said engagements being movably integrated into a respective one of said arms, each of said engagements engaging said housing at a variety of locations when the arms are urged between said retracted position and said extended position for retaining said arms at a selected degree of extension wherein said arms are configured to accommodate dimensions of the object placed on said housing; and
 a coupler being movably coupled to said housing wherein said coupler is configured to engage the support surface to inhibit said housing from sliding on the support surface;
 wherein said housing has a top wall and a perimeter wall extending therebetween wherein said top wall is configured to have an object positioned thereon, said perimeter wall having a distal edge with respect to said top wall to define an opening into said housing, said perimeter wall having a plurality of holes each extending into an interior of said housing, said holes being spaced apart from each other and being evenly distributed around said perimeter wall; and
 wherein said top wall has an access hole extending therethrough, said access hole being elongated, said access hole extending from a center point of said top wall toward said perimeter wall.

6. An object anchoring assembly for anchoring a variety of objects to a support surface, said assembly comprising:
 a housing being configured to be positioned on a horizontal support surface having an object being positioned on top of said housing;
 a plurality of arms, each of said arms being slidably integrated into said housing, each of said arms being positionable in a retracted position having each of said arms being retracted into said housing, each of said arms being positionable in an extended position having said arms extended outwardly from said housing;
 a plurality of engagements, each of said engagements being movably integrated into a respective one of said arms, each of said engagements engaging said housing at a variety of locations when the arms are urged between said retracted position and said extended position for retaining said anus at a selected degree of extension wherein said arms are configured to accommodate dimensions of the object placed on said housing; and
 a coupler being movably coupled to said housing wherein said coupler is configured to engage the support surface to inhibit said housing from sliding on the support surface;
 wherein said housing has a top wall and a perimeter wall extending therebetween wherein said top wall is configured to have an object positioned thereon, said perimeter wall having a distal edge with respect to said top wall to define an opening into said housing, said perimeter wall having a plurality of holes each extending into an interior of said housing, said holes being spaced apart from each other and being evenly distributed around said perimeter wall;

wherein said top wall has a lower surface, said lower surface having a plurality of grooves each extending upwardly therein, said plurality of grooves being arranged into a plurality of set of grooves, each of sets of grooves being spaced apart from each other and being distributed between a center point of said top wall and a respective one of said holes in said perimeter wall, each of said grooves defining a plurality of teeth; and wherein each of said arms has a first end, a second end and an outer wall extending therebetween, said first end being open, each of said arms being slidably positioned in a respective one of said holes in said perimeter wall of said housing, said outer wall having top side, each of said arms being oriented to extend along a receptive one of said sets of grooves in said lower surface of said top wall of said housing, said top side has a grip hole extending therethrough, said grip hole being positioned adjacent to said second end.

7. The assembly according to claim 6, Wherein said top side of said outer wall has a stop extending upwardly therefrom, said stop being aligned with said first end, said stop having a first surface being directed toward said housing.

8. The assembly according to claim 7, further comprising a plurality of bumpers, each of said bumpers being coupled to said first surface of said stop on a respective one of said arms Wherein each of said bumpers is configured to compress against the object when said arms are extended or retracted in said housing for restraining the object on said housing, each of said bumpers being comprised of a resiliently compressible material.

9. The assembly according to claim 6, wherein each of said engagements has a primary end and a secondary end, each of said engagements having a finger extending upwardly therefrom, said finger being positioned adjacent to said primary end of a respective engagement, each of said engagements being pivotally coupled to said respective arm at a pivot point being centrally located in said respective arm, each of said engagements extending outwardly through said first end of said respective arm such that said secondary end of each of said engagements is exposed Wherein said secondary end of each of said engagements is configured to be manipulated by a user.

10. The assembly according to claim 9, further comprising a plurality of biasing members, each of said biasing members being positioned within a respective one of said arms, each of said biasing members engaging said engagement that is positioned in said respective arm, each of said biasing members being positioned between said pivot point on said respective engagement and said secondary end of said respective engagement such that said primary end of said respective engagement is biased upwardly through said grip hole in said respective arm thereby facilitating said finger on said respective engagement to engage a respective one of grooves in said lower surface of said top wall of said housing for retaining said respective arm at a selected location.

11. The assembly according to claim 10, wherein said finger on a respective engagement disengaging said respective groove when said secondary end of said respective engagement is titled upwardly to facilitate said respective arm to be retracted or extended.

12. The object anchoring assembly of claim 1, further comprising said housing having a top wall and a perimeter wall extending therebetween wherein said top wall is configured to have the object positioned thereon, said perimeter wall having a distal edge with respect to said top wall to define an opening into said housing, said perimeter wall having a plurality of holes each extending into an interior of said housing, said holes being spaced apart from each other and being evenly distributed around said perimeter wall, said top wall having an access hole extending therethrough, said access hole being elongated, said access hole extending from a center point of said top wall toward said perimeter wall, said top wall having a lower surface, said lower surface having a plurality of grooves each extending upwardly therein, said plurality of grooves being arranged into a plurality of set of grooves, each of sets of grooves being spaced apart from each other and being distributed between said center point of said top wall and a respective one of said holes in said perimeter wall, each of said grooves defining a plurality of teeth;

each of said arms having a first end, a second end and an outer wall extending therebetween, said first end being open, each of said arms being slidably positioned in a respective one of said holes in said perimeter wall of said housing, said outer wall having top side, said top side having a grip hole extending therethrough, said grip hole being positioned adjacent to said second end, said top side of said outer wall having a stop extending upwardly therefrom, said stop being aligned with said first end, said stop having a first surface being directed toward said housing, each of said arms being oriented to extend along a receptive one of said sets of grooves in said lower surface of said top wall of said housing;

each of said engagements having a primary end and a secondary end, each of said engagements having a finger extending upwardly therefrom, said finger being positioned adjacent to said primary end of a respective engagement, each of said engagements being pivotally coupled to said respective arm at a pivot point being centrally located in said respective arm, each of said engagements extending outwardly through said first end of said respective arm such that said secondary end of each of said engagements is exposed wherein said secondary end of each of said engagements is configured to be manipulated by a user;

a plurality of biasing members, each of said biasing members being positioned within a respective one of said arms, each of said biasing members engaging said engagement that is positioned in said respective arm, each of said biasing members being positioned between said pivot point on said respective engagement and said secondary end of said respective engagement such that said primary end of said respective engagement is biased upwardly through said grip hole in said respective arm thereby facilitating said finger on said respective engagement to engage a respective one of grooves in said lower surface of said top wall of said housing for retaining said respective arm at a selected location, said finger on a respective engagement disengaging said respective groove when said secondary end of said respective engagement is lifted upwardly to facilitate said respective arm to be retracted or extended;

a plurality of bumpers, each of said bumpers being coupled to said first surface of said stop on a respective one of said arms wherein each of said bumpers is configured to compress against the object when said arms are extended or retracted in said housing for restraining the object on said housing, each of said bumpers being comprised of a resiliently compressible material;

and a lever being movably coupled to said coupler, said lever being positioned in said access hole in said top wall of said housing wherein said lever is configured to be accessible to a user, said lever engaging said apex on said top side of said coupler, said lever urging said apex upwardly from said distal edge of said coupler when distal edge engages the support surface and when said lever is moved into a locking position wherein said lever is configured to urge said coupler to suctionally engage the support surface, said lever urging said apex downwardly toward said distal edge when said lever is moved into an unlocking position wherein said lever is configured to urge said coupler to disengage the support surface.

* * * * *